United States Patent [19]

Sweeney et al.

[11] 4,143,921

[45] Mar. 13, 1979

[54] SLURRY INPUT FOR A MULTIPLE FEED SUMP

[75] Inventors: William T. Sweeney, Ponca City, Okla.; Thomas H. Plate, Morgantown, W. Va.

[73] Assignee: Continental Oil Company, Ponca City, Okla.

[21] Appl. No.: 842,011

[22] Filed: Oct. 13, 1977

[51] Int. Cl.² .................................................. B65G 53/30
[52] U.S. Cl. ........................................ 302/14; 37/62; 141/388
[58] Field of Search ............... 141/231, 232, 279, 284, 141/387, 388; 302/14, 16, 34; 61/100; 37/62

[56] References Cited

U.S. PATENT DOCUMENTS

| | | | |
|---|---|---|---|
| 1,685,927 | 10/1928 | Miller | 141/388 X |
| 3,032,082 | 5/1962 | Vilain | 141/388 X |
| 3,727,650 | 4/1973 | Ingram et al. | 141/279 X |
| 3,884,528 | 5/1975 | Shaddock | 141/279 X |

*Primary Examiner*—Richard E. Aegerter
*Assistant Examiner*—Frederick R. Schmidt
*Attorney, Agent, or Firm*—William J. Miller

[57] ABSTRACT

An input for a sump for uniformly distributing material along the length of the sump has a support mounted above and along the length of the sump with a flexible pipe extending over the sump and moveably attached to the support. One end is connected to a discharge outlet which is positioned over the sump for depositing material into the sump, and the other end passes through an arcuate bend to a pipe which is connected to a source of slurry. Apparatus is attached between the support and the discharge outlet for moving the discharge outlet along the length of the sump in a predetermined manner which will either depend on the movement of the dredge and/or the density distribution of the material in the bottom of the sump.

5 Claims, 5 Drawing Figures

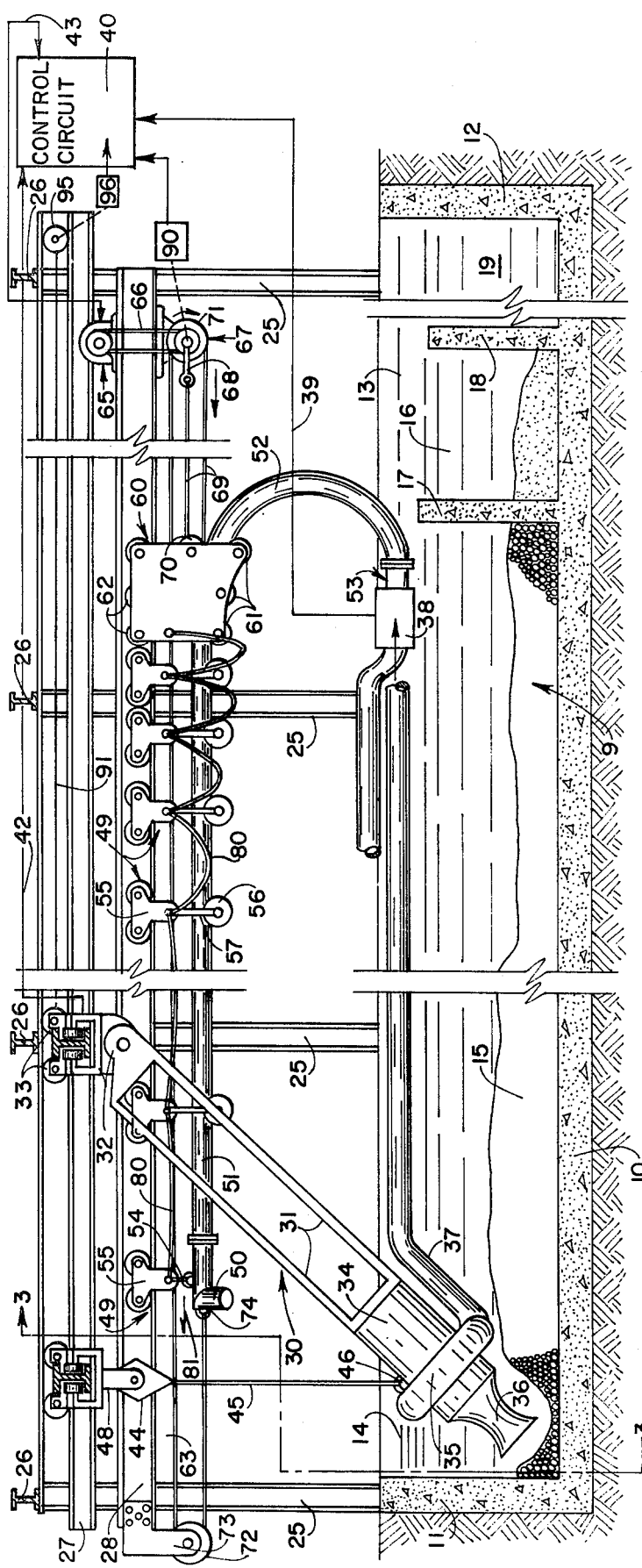
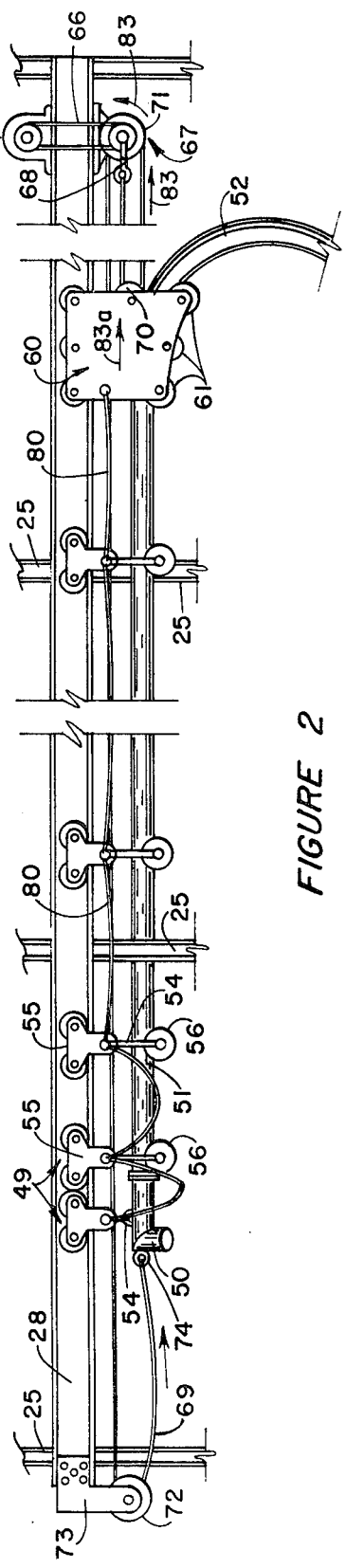
FIGURE 1
FIGURE 2

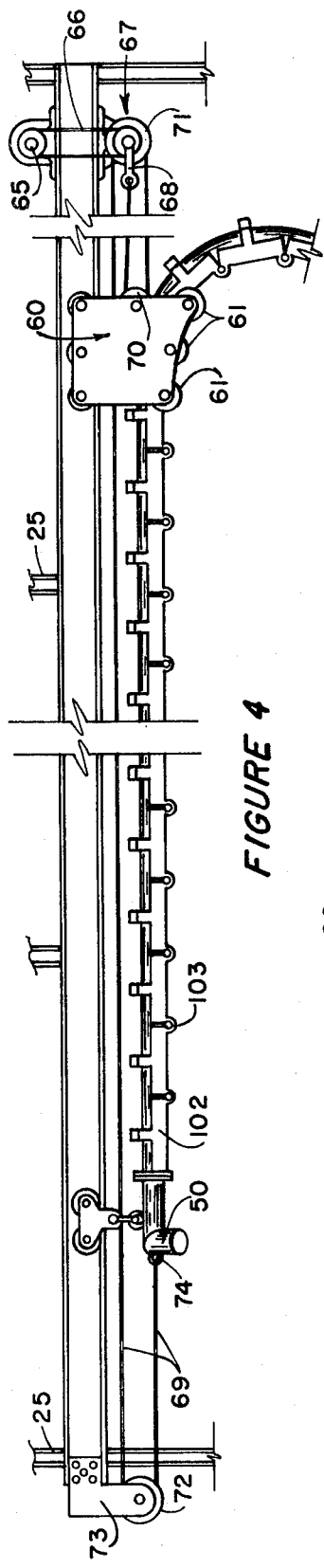
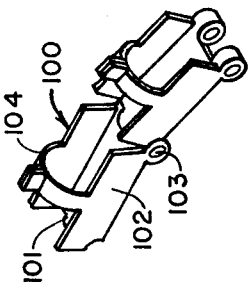
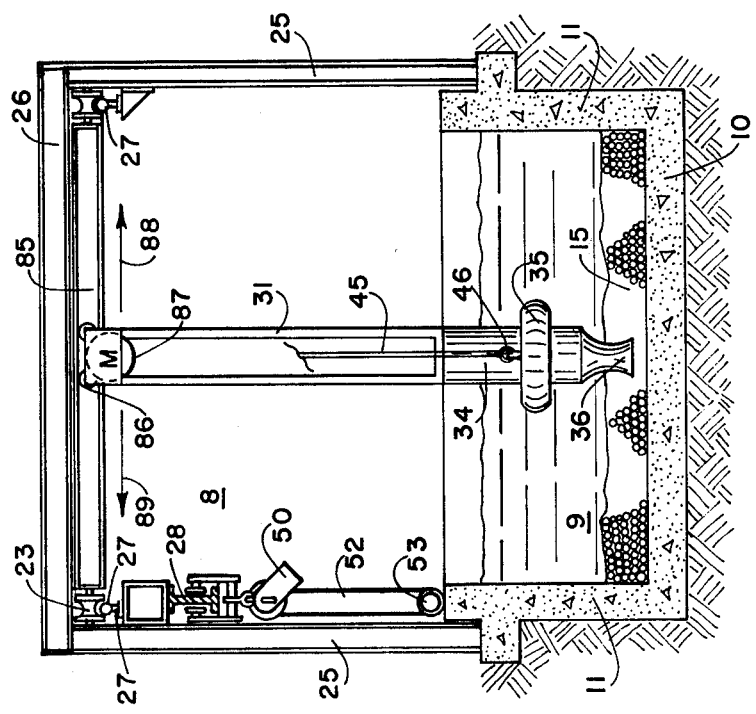
FIGURE 4
FIGURE 5
FIGURE 3

SLURRY INPUT FOR A MULTIPLE FEED SUMP

BRIEF DESCRIPTION OF THE PRIOR ART

The closest prior art known to applicants are U.S. Pat. Nos. 3,920,039 to Jamison and Coval and 3,981,541 to Doerr, McCain and Dahl. The former patent describes a monorail system used for supporting a pair of hoses in a mine which are connected to a slurry apparatus for moving water into and water and coal slurry away from a mine face. The latter patent, in FIGS. 3 and 4, discloses a monorail system for supporting a dredge hose above a long sump. A U.S. Pat. No. 3,450,173 to Maizel shows a traveling loop for filling a plurality of individual containers in a side-by-side relationship. A U.S. Pat. No. 3,911,975 to van Soestberger et al. illustrates a traveling overhead conveyor having a pipe connected thereto for filling a plurality of individual openings into individual tanks in a tank car or tank truck.

None of the above patents, however, disclose a system adaptable to a slurry sump where material can be distributed into the sump along the length of the sump in some predictable manner, particularly where the hose must be stored and suspended horizontally at varying lengths along the sump as the discharge outlet moves along the length of the sump depositing material therein.

BRIEF DESCRIPTION OF THE INVENTION

This invention describes a discharge outlet for a long, narrow sump where material must be deposited evenly along the length of the sump to utilize the sump to its greatest capacity. The invention also provides a means of depositing the material away from the dredge intake to prevent cavitating and overloading of the dredge pump. The invention contemplates movement of the discharge outlet in synchronism with the movement of the dredge or in some programmable manner based on the density of the material being discharged into the sump, the level of the material in the sump, or other suitable criteria.

BRIEF DESCRIPTION OF THE FIGURES

FIG. 1 illustrates a longitudinal cross-sectional view of a sump having a moveable discharge outlet mounted above it;

FIG. 2 illustrates the operation of the sump with the discharge being moved toward the water storage end of the sump;

FIG. 3 is a cross-sectional view of the sump taken through lines 3—3 of FIG. 1;

FIG. 4 illustrates a modified support system for the hose; and

FIG. 5 is a perspective view of a pair of links used in the device illustrated in FIG. 4.

DETAILED DESCRIPTION OF THE INVENTION

Referring to FIGS. 1 through 3, but in particular to FIG. 1, a sump 9 is shown having a bottom 10, end walls 11 and 12 and a side wall 13. The remaining side wall is not illustrated on FIG. 1, since the view is a sectional view. Sump 9 is normally filled with a quantity of water 14 and material such as coal 15. A fines separation tank 16 is formed by a partition 17 which permits water to flow from the main sump over the top of partition 17 and into fines separation tank 16. A second partition 18 separates the fines separation tank 16 from a water storage tank 19. Pumps (not shown) are normally used to remove the water from water storage tank 19 as the water accumulates by passing over partition 18.

A super structure is constructed over the sump and can be done in one of several ways. When the sump is used in a mine, the preferred way is to erect a roof support apparatus comprising a plurality of vertical "I" beams 25. A plurality of horizontal "I" beams 26 ties opposite "I" beams 25 together and supports in part the weight of the roof of the mine. Normally steel or timber lagging may be placed between horizontal "I" beams 26 to catch falling roof debris and to partially support the roof as it accomodates the change in stress created by forming the sump.

It is obvious, of course, that if the sump is formed in some location other than in a mine, then the roof supporting mechanism might not be necessary. Horizontal "I" beams 26 will only supply the necessary structural rigidity to the framework.

Connected between vertical "I" beams 25 are horizontal rails 27 and 28.

Dredging apparatus generally referred to by an arrow 30 comprises a supporting structure 31 mounted at 32 to a plurality of rollers 33 which permit movement of the dredge horizontally along the sump along rails 27.

At the other end of supporting structure 31 is attached a motor 34 which drives pump 35. Pump 35 has its inlet connected to a suction orifice 36 and its outlet connected to a discharge pipe 37.

The lower portion of dredge 30 is supported by a winch or hoist 44 attached through a cable 45 to an anchor point 46 on the housing of pump 35. Hoist 44 is moveably journaled on rail 27 by an assembly 48. Hoist 44 can raise or lower the pump 35 by lengthening or shortening cable 45 so that suction orifice 36 can be positioned at any desired elevation or removed from the sump. The outlet from discharge pipe 37 is normally connected to a series of pumps which eventually move the material to a disposal point.

On rail 28 is journaled a moveable discharge outlet 50 which is connected to a pipe 51 made of a flexible material such as rubber. Pipe 51 passes through a 180° bend 52 and is connected at the terminus of the bend to rigid pipe 53 which in turn is connected to a source of slurry such as a mine face, for example. Discharge outlet 50 is moveably attached through a support assembly 49 to rail 28 by means of a link 54 and a roller assembly 55 which rides on the upper surface of the bottom portion of an "I" beam which forms rail 28. Flexible pipe 51 is likewise supported by another roller assembly 49 which includes a concave-shaped roller 56 which is attached to roller assembly 55 through a linkage 57. A sufficient number of roller assemblies 49 is provided to adequately support flexible pipe 51 along its length so that pipe 51 will remain substantially horizontal. The number of assemblies will depend upon both the length of pipe 51 and its flexibility.

A turn support apparatus generally referred to by an arrow 60 has a plurality of rollers 61 which support loop 52 and assist in moving the pipe through the loop as it is being played out or taken in. Apparatus 60 is likewise moveably supported on rail 28 by a plurality of rollers 62.

In order to move discharge outlet 50 along the length of sump 9, a cable, motor and pulley arrangement are provided and comprise motor 65, which can, for example, be mounted on rail 28. Motor 65 is reversible and variable speed. Its output is connected through a belt 66 to a pulley assembly 67. A cable 69 is attached at its first end to an anchor 68 and passes around pulley 70 which is journaled in turn support apparatus 60. The cable then passes around pulley 71 of assembly 67 and continues along the length of the sump where it passes around pulley 72 which is attached to rail 28 through a bracket 73 and finally is attached at the other end to discharge outlet 50 at anchor location 74. A wire 43 is connected from control circuit 40 to motor 65.

Between each of the roller assemblies 49 is connected a cable 80 which defines the maximum spacing between assemblies 49, thereby providing adequate support along the length of pipe 51.

OPERATION

The operation of the preferred embodiment described above is as follows:

Normally a slurry comprising water and a solid material as, for example, coal enters pipe 53, passes around loop 52, along flexible pipe 51, and out discharge outlet 50 where it drops into the sump. The solid material tends to settle out as material 15 in the bottom of the sump and the fluid, for example, water tends to separate and pass into the fines separation tank 16 where additional sediment is removed and subsequently into water storage tank 19 where the excess water is removed by means of a pump (not shown). The material 15 is removed from sump 9 by a dredge 30 which moves along rails 27 sucking up the solid material 15 into its orifice 36, through pump 35 and discharges some into pipe 37.

The movement of discharge outlet 50 is accomplished by motor 65 rotating, causing belt 66 to rotate which in turn rotates pulley 71. Movement of pulley 71 will cause cable 69 to move in the direction of rotation of pulley 71. For example, if pulley 71 is rotating in a clockwise manner as illustrated in FIG. 1, then discharge outlet 50 will move in the direction of arrow 81. Since roller assembly 49 is coupled to discharge outlet 50, assembly 49 will likewise move in the direction of arrow 81. Once cable 80 is stretched to its fullest extent, the second roller assembly 49 adjacent discharge outlet 50 will begin to move. As additional roller assemblies 49 are pulled by the adjacent cables 80, continual support is provided for flexible pipe 51.

Referring to FIG. 2, when pulley 71 is being rotated in a counterclockwise direction, the cable will be moved in a direction of arrow 83, causing a slack to develop in the cable 69 attached to discharge outlet 50.

It should be noted that turn support apparatus 60 will also move in the direction of arrow 83a but its rate of movement will be only half that of discharge outlet 50, due to the arrangement of pulleys connected between turn support apparatus 60 and pulley assembly 67. Turn support apparatus 60 must move only half the distance of discharge outlet 50, because the movement at the center of the 180° loop is retreating in the direction of arrow 83a at only half the distance that discharge outlet 50 is moving.

Dredging apparatus 30 and its operation has not been explained in detail since the actual dredging apparatus is old in the art and its function is very simple. Referring to FIG. 3, it is obvious that the dredging apparatus can move along rails 27 and in addition can move along an "I" beam 85 through rollers 86 which are driven by a motor 87 in the direction of arrow 88 or arrow 89, so that the entire quantity of material 15 can be removed from the bottom of the sump.

It is also obvious that discharge outlet 50, while being shown on only one side of sump 9, can be placed on both sides of sump 9.

Discharge Outlet Control

As the slurry passes into pipe 53, it may pass through a density meter 38 which will measure the ratio of solids to liquid coming from the mine face. This information is transferred through wire 39 to a control circuit 40. The output from control circuit 40 is coupled to motor 65 by means of a wire 43. The output, when properly coupled to motor 65, can control the movement of discharge outlet 50 in proportion to the amount of material in the bottom of sump 9 resulting in a more uniform take-up by dredge 30.

It is further contemplated that a position apparatus can be connected to discharge outlet 50. The position apparatus may comprise a means for measuring the position of cable 69 by stops and microswitches, etc, so that discharge outlet 50 can be controlled as to its proximity to the suction orifice 36 of dredge 30. In this regard, when discharge outlet 50 approaches suction orifice 36, it can be reversed in direction or otherwise manipulated so that the material from discharge outlet 50 is not dumped directly on top of orifice 36. Such an operation could result in either providing too much material for the pump 35 to remove or too much air in the vicinity of orifice 36, thus affecting operation of pump 35. Such a position control apparatus previously mentioned can also be, for example, a tachometer 90 coupled through a mechanical linkage to pulley 71 which can determine the actual position of discharge outlet 50 by counting the rotations of pulley 71. Position apparatus can also be incorporated for the dredge 30 by tying a cable 91 between mounting system 32 and a spring-loaded pulley 95. A tachometer 96 is coupled through a mechanical coupling, so that the tachometer 96 can count the rotation of pulley 95 which is indicative of the length of cable 91 and hence the position of dredge 30. The rotation output from tachometer 96 and tachometer 90 can be coupled into controller 40 so that discharge outlet 50 will not dump material in the near vicinity of orifice 36.

Modified Embodiment

Referring to FIGS. 4 and 5, a modified support apparatus is illustrated which incorporates a linkage system comprising a plurality of individual links 100, each link of which has a bottom 101, side walls 102 and a pivot location 103. Upper pipe supports 104 retain flexible pipe 51 in the links but are not so tight that they prevent sliding of the pipe during the 180° bend. The rollers 61 on turn support apparatus 60 are modified to accommodate the linkage apparatus. The operation of the device is identical to that described in FIGS. 1 through 3. The advantages of the linkage apparatus shown in FIGS. 4 and 5 are that it does not require the plurality of support roller assemblies 49 comprising rollers 56 or linkages 57 along with interconnecting cables 80.

It is obvious, of course, that changes can be made in the particular preferred embodiments disclosed and still be within the spirit and scope of the invention as disclosed in the specification and appended claims.

What is claimed is:

1. Apparatus for uniformly distributing material along the length of a sump comprising:

a. support means mounted above and along the length of said sump;
b. dredge means movably attached to said support means and having an inlet positioned in said sump;
c. flexible means having an inlet and an outlet and extending over said sump and connected through an arcuate bend to a pipe at the inlet end of said sump;
d. discharge outlet means positioned over said sump and coupled to said outlet end of said flexible hose;
e. means for movably supporting said discharge outlet means, said flexible hose, and said arcuate bend to said support means,
f. means for moving said discharge means and flexible pipe along the length of said sump; and
g. position apparatus means coupled between said dredge means and said discharge outlet means to determine the position of each so that material is not discharged from said discharge means in the proximity of the inlet of said dredge means.

2. Apparatus as described in claim 1 wherein said support means comprises a track and wherein said movable supporting means comprises a first roller means engaging said track and attached to a second roller means mounted under said flexible pipe, said movable supporting means positioned at spaced intervals.

3. Apparatus as described in claim 1 wherein said support means comprises a track and wherein said movable supporting means comprises a plurality of linkage means movably supported from said track, said linkage means spaced to prevent sagging of said flexible pipe when supported by said track and permit bending of said flexible pipe when said flexible pipe passes through said arcuate bend.

4. Apparatus of claim 3 additionally including a support carriage for said arcuate bend and means for movably supporting said carriage to said support means.

5. Apparatus of claim 1 additionally including a support carriage for said arcuate bend and means for movably supporting said carriage to said support means.

* * * * *

UNITED STATES PATENT OFFICE
CERTIFICATE OF CORRECTION

PATENT NO. : 4,143,921
DATED : March 13, 1979
INVENTOR(S) : Sweeney et al

It is certified that error appears in the above-identified patent and that said Letters Patent are hereby corrected as shown below:

Column 5, line 5, after "flexible" insert --pipe--.

Signed and Sealed this

Twenty-second Day of May 1979

[SEAL]

Attest:

RUTH C. MASON
Attesting Officer

DONALD W. BANNER
Commissioner of Patents and Trademarks